(12) United States Patent
Ohhashi

(10) Patent No.: US 7,944,804 B2
(45) Date of Patent: May 17, 2011

(54) OPTICAL DISK RECORDING METHOD, OPTICAL DISK DEVICE, PROGRAM, AND RECORDING MEDIUM

(75) Inventor: Naoya Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 230 days.

(21) Appl. No.: 11/919,124

(22) PCT Filed: Apr. 26, 2006

(86) PCT No.: PCT/JP2006/309198
§ 371 (c)(1),
(2), (4) Date: Oct. 24, 2007

(87) PCT Pub. No.: WO2006/120986
PCT Pub. Date: Nov. 16, 2006

(65) Prior Publication Data
US 2009/0080310 A1    Mar. 26, 2009

(30) Foreign Application Priority Data

May 9, 2005   (JP) .................................. 2005-135504

(51) Int. Cl.
*G11B 7/00* (2006.01)

(52) U.S. Cl. ................ 369/275.1; 369/275.2; 369/275.5

(58) Field of Classification Search .................. 369/30.1
See application file for complete search history.

(56) References Cited

U.S. PATENT DOCUMENTS

| | | | |
|---|---|---|---|
| 5,881,032 A * | 3/1999 | Ito et al. ........................ | 369/30.1 |
| 7,203,153 B2 * | 4/2007 | Kuraoka et al. ............. | 369/275.3 |
| 7,489,620 B2 * | 2/2009 | Okada et al. ............... | 369/275.3 |
| 2002/0126602 A1 | 9/2002 | Van Woudenberg | |
| 2003/0202443 A1 | 10/2003 | Ohhasi et al. | |
| 2003/0231568 A1 | 12/2003 | Ohhashi | |
| 2004/0156294 A1 * | 8/2004 | Watanabe et al. ............... | 369/94 |
| 2005/0235104 A1 * | 10/2005 | Ohhashi ....................... | 711/112 |
| 2005/0270953 A1 | 12/2005 | Okada et al. | |
| 2006/0250922 A1 * | 11/2006 | Sasaki ........................ | 369/59.25 |

FOREIGN PATENT DOCUMENTS

| | | |
|---|---|---|
| EP | 1 538 609 | 6/2005 |
| EP | 1538609 A1 * | 6/2005 |
| JP | 2003-16648 | 1/2003 |
| JP | 2004-110962 | 4/2004 |
| JP | 2004-288331 | 10/2004 |
| JP | 2004-310481 | 11/2004 |
| JP | 2004-327038 | 11/2004 |
| JP | 2005-4855 | 1/2005 |
| JP | 2005-158143 | 6/2005 |
| JP | 2005-302143 | 10/2005 |
| WO | WO 2004/019326 | 3/2004 |

* cited by examiner

*Primary Examiner* — Joseph H Feild
*Assistant Examiner* — Kezhen Shen
(74) *Attorney, Agent, or Firm* — Dickstein Shapiro LLP

(57) ABSTRACT

In an optical disk recording method adapted to record information on an optical disk by a light beam incident to the disk in one direction, the disk has a plurality of rewritable recording layers including a first layer nearest to a plane of incidence and a second layer distant from the plane of incidence. A target layer where user data is to be recorded is specified from the first and second layers. Prior to recording the user data to a requested address in the second layer when the target layer is the second layer, a partial region of the first layer corresponding to a same radial position as the requested address in the second layer is set to either a non-recorded state or a recorded state depending on a characteristic of the disk. The user data is recorded to the requested address in the target layer.

11 Claims, 15 Drawing Sheets

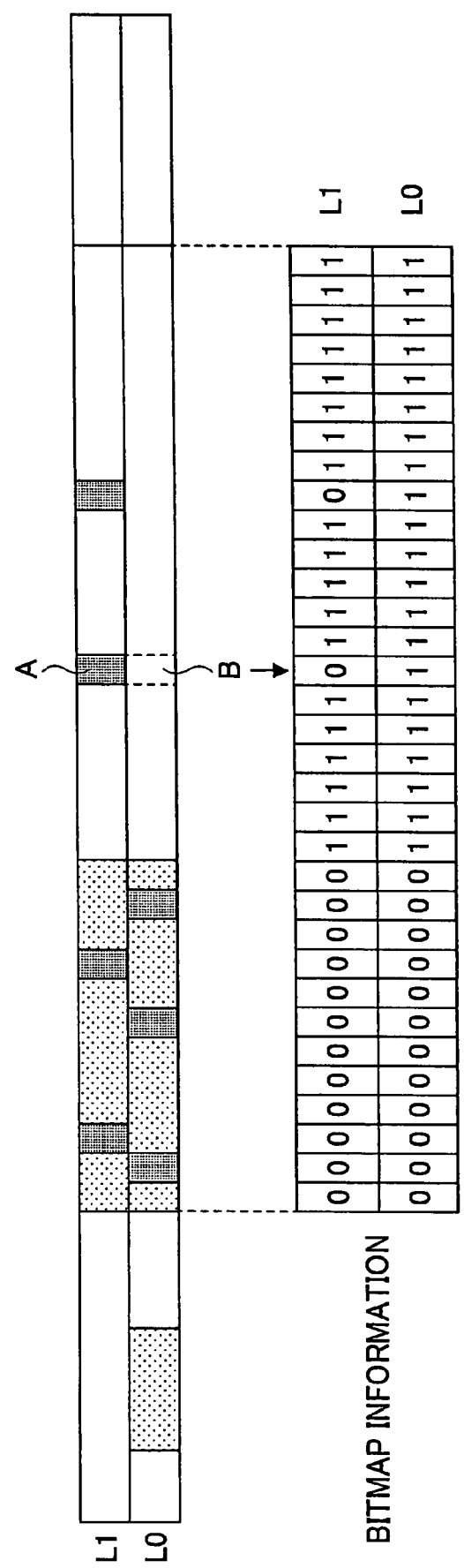

OPTICAL DISK RECORDING METHOD, OPTICAL DISK DEVICE, PROGRAM, AND RECORDING MEDIUM

TECHNICAL FIELD

The present invention relates to an optical disk recording method, an optical disk device, a program and a recording medium which are adapted to perform recording of information to an optical disk having a plurality of rewritable recording layers.

BACKGROUND ART

In recent years, with progress of digital technology and improvement in data compression technology, information recording media for recording computer programs, music information, video information (contents), etc., which include optical disks, such as CD (compact disk) and DVD (digital versatile disk), have come to attract attention. And inexpensive optical disk devices for performing recording of information to such an optical disk and reproducing of information from the optical disk have come to spread.

What are currently marketed as rewritable optical disks are CD-RW (CD-rewritable), DVD-RAM, DVD-RW (DVD-rewritable), DVD+RW (DVD+rewritable), etc.

Meanwhile, the amount of information of video information or contents tends to increase year by year, and it is expected that the amount of information that is recordable on a single optical disk, i.e., the storage capacity, will further increase.

For this reason, the development of an optical disk having a plurality of rewritable recording layers is performed energetically. However, there is a problem that at the time of recording (or reproducing) of information to a target recording layer of such a multilayered optical disk, which is distant from the plane of incidence of the irradiated light beam, the target recording layer is influenced not a little by a recording state of another recording layer of the disk nearer than the target recording layer to the plane of incidence. For example, see Japanese Laid-Open Patent Application No. 2004-327038.

The influence depends on the material characteristics of the optical disk concerned, and it is not necessarily simple. Although the optical disk having the plurality of rewritable recording layers is not marketed currently, the above-mentioned problem is one of the issues which should be cleared for commercial production.

DISCLOSURE OF THE INVENTION

According to one aspect of the invention, there is provided an improved optical disk recording method in which the above-mentioned problems are eliminated.

According to one aspect of the invention, there is provided any of an optical disk recording method, an optical disk device, a program, and a recording medium which are arranged for stably performing recording of information to an optical disk having a plurality of rewritable recording layers with high quality.

In an embodiment of the invention which solves or reduces one or more of the above-mentioned problems, there is provided an optical disk recording method which is adapted to record information on an optical disk by a light beam incident to the optical disk in one direction, the optical disk having a plurality of rewritable recording layers including a first recording layer nearest to a plane of incidence of the light beam and a second recording layer distant from the plane of incidence, the method comprising the steps of: specifying a target recording layer where user data is to be recorded from the first and second recording layers; detecting whether the specified target recording layer is the second recording layer; setting, prior to recording the user data to a requested address in the second recording layer when the specified target recording layer is the second recording layer, a partial region of the first recording layer corresponding to a radial position that is the same as that of the requested address in the second recording layer, to a selected recording state of either a non-recorded state or a recorded state depending on a characteristic of the optical disk; and recording the user data to the requested address in the second recording layer specified as the target recording layer.

According to the above-mentioned optical disk recording method of the invention, when recording information in a second recording layer of a rewritable one-side multi-layered optical disk, which is different from a first recording layer nearest to the plane of incidence of the light beam, a partial region of the first recording layer corresponding to a radial position that is the same as that of the requested address in the second recording layer is set to a selected recording state of either a non-recorded state or a recorded state depending on the characteristic of the disk, prior to recording of user data to the requested address in the second recording layer. That is, the recording state of the partial region can be changed to the selected recording state appropriate for the characteristic of the disk prior to recording of information to the requested address in the target recording layer, and it is possible to control deterioration of the recording quality of information recorded to the requested address in the target recording layer.

Accordingly, it is possible to perform stably recording of information to an optical disk having a plurality of rewritable recording layers with high quality.

The above-mentioned optical disk recording method may be configured so that the method further comprises a step of detecting whether the disk is provided to have a characteristic that a recording quality in the second recording layer deteriorates if a non-recorded area exists in the partial region of the first recording layer.

The above-mentioned optical disk recording method may be configured so that, when it is detected that the disk is provided to have said characteristic, dummy data is recorded in the partial region of the first recording layer, in the step of setting the partial region to the selected recording state, so that the partial region is set in the recorded state.

The above-mentioned optical disk recording method may be configured so that the method further comprises a step of detecting whether the disk is provided to have a characteristic that a recording quality in the second recording layer deteriorates if a recorded area exists in the partial region of the first recording layer.

The above-mentioned optical disk recording method may be configured so that, when it is detected that the disk is provided to have said characteristic, data currently recorded in the partial region of the first recording layer is erased in the step of setting the partial region to the selected recording state, so that the partial region is set in the non-recorded state.

The above-mentioned optical disk recording method may be configured so that, in the step of setting the partial region to the selected recording state, the data currently recorded in the partial region of the first recording layer is saved prior to erasing the currently recorded data.

The above-mentioned optical disk recording method may be configured so that the method further comprises a step of recording, following the step of recording the user data to the requested address in the second recording layer, saved data to the partial region of the first recording layer.

The above-mentioned optical disk recording method may be configured so that the disk comprises bitmap information which contains a given number of bits each indicating either the non-recorded state or the recorded state for every partial region in a data region of the disk and is recorded in a disk information area of the disk, and, in the step of setting the partial region to the selected recording state, it is detected whether a recording state of the partial region of the second recording layer is the non-recorded state, based on the bitmap information acquired from the disk.

The above-mentioned optical disk recording method may be configured so that, when two or more recording layers nearer to the plane of incidence of the light beam than the target recording layer exist in the disk, a recording state of each of the two or more recording layers is set to the selected recording state sequentially from one of the two or more recording layers nearest to the plane of incidence.

In an embodiment of the invention which solves or reduces one or more of the above-mentioned problems, there is provided an optical disk device including a processor adapted to record information on an optical disk by a light beam incident to the disk in one direction, the disk having a plurality of rewritable recording layers including a first recording layer nearest to a plane of incidence of the light beam and a second recording layer distant from the plane of incidence, the processor comprising: a first unit specifying a target recording layer where user data is to be recorded from the first and second recording layers; a second unit detecting whether the specified target recording layer is the second recording layer; a third unit setting, prior to recording the user data to a requested address in the second recording layer when the specified target recording layer is the second recording layer, a partial region of the first recording layer corresponding to a radial position that is the same as that of the requested address in the second recording layer, to a selected recording state of either a non-recorded state or a recorded state depending on a characteristic of the disk; and a fourth unit recording the user data to the requested address in the second recording layer specified as the target recording layer.

According to the above-mentioned optical disk device of the invention, when recording information in a second recording layer of a rewritable one-side multi-layered optical disk, which is different from a first recording layer nearest to the plane of incidence of the light beam, a partial region of the first recording layer corresponding to a radial position that is the same as that of the requested address in the second recording layer is set to a selected recording state of either a non-recorded state or a recorded state depending on the characteristic of the disk, prior to recording of user data to the requested address in the second recording layer. That is, the recording state of the partial region can be changed to the selected recording state appropriate for the characteristic of the disk prior to recording of information to the requested address in the target recording layer, and it is possible to control deterioration of the recording quality of information recorded to the requested address in the target recording layer.

Accordingly, it is possible to perform stably recording of information to an optical disk having a plurality of rewritable recording layers with high quality.

The above-mentioned optical disk device may be configured so that the processor further comprises a detecting unit detecting whether the disk is provided to have a characteristic that a recording quality in the second recording layer deteriorates if a non-recorded area exists in the partial region of the first recording layer, and the third unit is configured to record, when it is detected that the disk is provided to have said characteristic, dummy data in the partial region of the first recording layer, so that the partial region is set in the recorded state.

The above-mentioned optical disk device may be configured so that the processor further comprises a detecting unit detecting whether the disk is provided to have a characteristic that a recording quality in the second recording layer deteriorates if a recorded area exists in the partial region of the first recording layer, and the third unit is configured to erase, when it is detected that the disk is provided to have said characteristic, data currently recorded in the partial region of the first recording layer, so that the partial region is set in the non-recorded state.

The above-mentioned optical disk device may be configured so that the third unit is configured to save the data currently recorded in the partial region of the first recording layer prior to erasing the currently recorded data.

The above-mentioned optical disk device may be configured so that the processor further comprises a recording unit recording, following the recording of the user data to the requested address in the second recording layer by the fourth unit, saved data to the partial region of the first recording layer.

The above-mentioned optical disk device may be configured so that the disk comprises bitmap information which contains a given number of bits each indicating either the non-recorded state or the recorded state for every partial region in a data region of the disk and is recorded in a disk information area of the disk, and the third unit is configured to detect whether a recording state of the partial region of the second recording layer is the non-recorded state, based on the bitmap information acquired from the disk.

The above-mentioned optical disk device may be configured so that the third unit is configured to set, when two or more recording layers nearer to the plane of incidence of the light beam than the target recording layer exist in the disk, a recording state of each of the two or more recording layers to the selected recording state sequentially from one of the two or more recording layers nearest to the plane of incidence.

In an embodiment of the invention which solves or reduces one or more of the above-mentioned problems, there is provided a computer-readable program which, when executed by a computer, causes the computer to perform an optical disk recording method which is adapted to record information on an optical disk by a light beam incident to the disk in one direction, the disk having a plurality of rewritable recording layers including a first recording layer nearest to a plane of incidence of the light beam and a second recording layer distant from the plane of incidence, the optical disk recording method comprising the steps of: specifying a target recording layer where user data is to be recorded from the first and second recording layers; detecting whether the specified target recording layer is the second recording layer; setting, prior to recording the user data to a requested address in the second recording layer when the specified target recording layer is the second recording layer, a partial region of the first recording layer corresponding to a radial position that is the same as that of the requested address in the second recording layer, to a selected recording state of either a non-recorded state or a recorded state depending on a characteristic of the disk; and recording the user data to the requested address in the second recording layer specified as the target recording layer.

According to the above-mentioned computer-readable program of the invention, when recording information in a second recording layer of a rewritable one-side multi-layered optical disk, which is different from a first recording layer nearest to the plane of incidence of the light beam, a partial region of the first recording layer corresponding to a radial position that is the same as that of the requested address in the second recording layer is set to a selected recording state of either a non-recorded state or a recorded state depending on the characteristic of the disk, prior to recording of user data to the requested address in the second recording layer. That is, the recording state of the partial region can be changed to the selected recording state appropriate for the characteristic of the disk prior to recording of information to the requested address in the target recording layer, and it is possible to control deterioration of the recording quality of information recorded to the requested address in the target recording layer.

Accordingly, it is possible to perform stably recording of information to an optical disk having a plurality of rewritable recording layers with high quality.

In an embodiment of the invention which solves or reduces one or more of the above-mentioned problems, there is provided a computer-readable recording medium on which the above-mentioned computer-readable program is stored.

According to the embodiments of the invention, it is possible to perform stably recording of information to an optical disk having a plurality of rewritable recording layers with high quality.

Other objects, features and advantages of the present invention will be apparent from the following detailed description when reading in conjunction with the accompanying drawings.

BRIEF DESCRIPTION OF THE DRAWINGS

FIG. 9A, FIG. 9B, FIG. 9C and FIG. 9D are diagrams for explaining the recording processing of FIG. 8A and FIG. 8B.

BEST MODE FOR CARRYING OUT THE INVENTION

A description will now be given of an embodiment of the invention with reference to the accompanying drawings.

Figure 1:
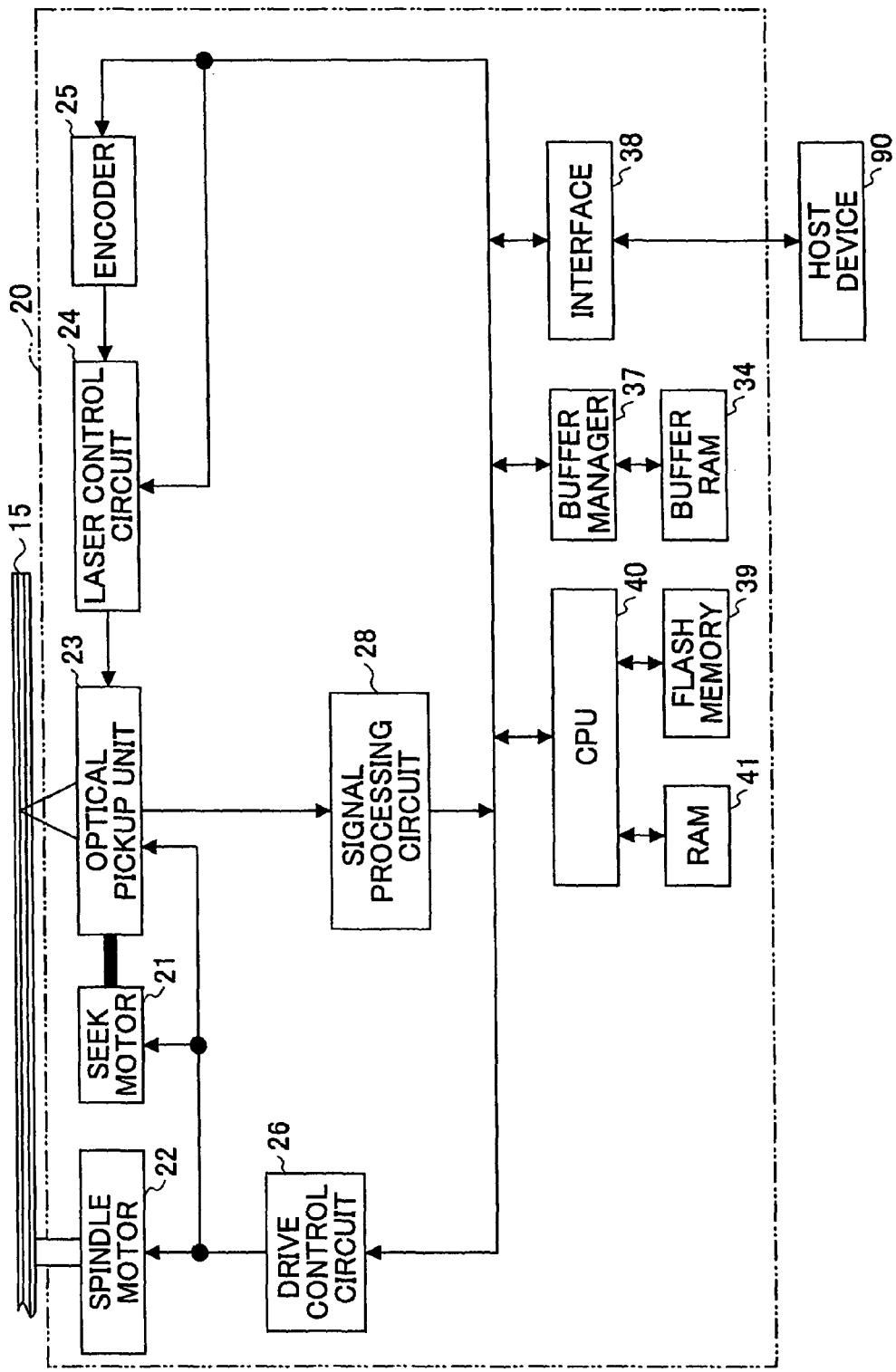
FIG. 1 is a block diagram showing the composition of an optical disk device in an embodiment of the invention.

FIG. 1 shows the composition of an optical disk device 20 in an embodiment of the invention. As shown in FIG. 1, the optical disk device 20 comprises a spindle motor 22 for rotating an optical disk 15, an optical pickup unit 23, a seek motor 21 for driving the optical pickup unit 23 in a radial direction of the disk 15, a laser control circuit 24, an encoder 25, a drive control circuit 26, a signal processing circuit 28, a buffer RAM 34, a buffer manager 37, an interface 38, a flash memory 39, a CPU 40, and an RAM 41.

In FIG. 1, the arrow merely indicates the flow of a typical signal or typical information, and it does not indicate the physical connection between respective elements of the optical disk device.

In the present embodiment, the optical disk device 20 is adapted to record information in a multi-layered optical disk which has a plurality of rewritable recording layers.

Figure 2:
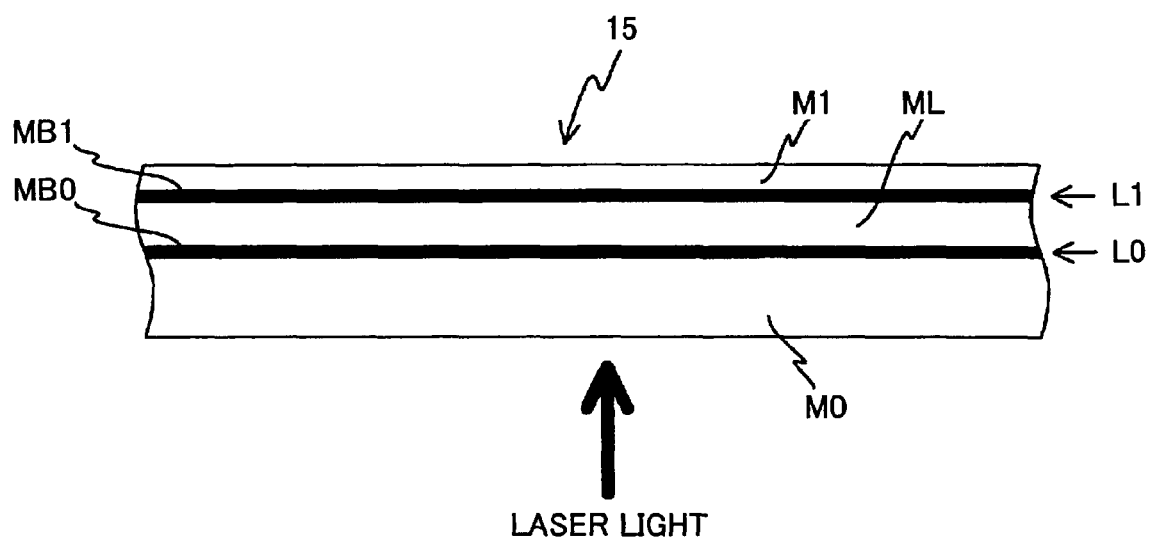
FIG. 2 is a diagram showing the structure of an optical disk in the optical disk device of FIG. 1.

FIG. 2 shows the structure of the optical disk in the optical disk device of FIG. 1. As shown in FIG. 2, the optical disk 15 is made up of a substrate M0, a recording layer L0, a middle layer ML, a recording layer L1, and a substrate M1, which are sequentially formed in this order from the plane of incidence of the irradiated laser light beam.

A translucent film MB0 which is made of gold or a dielectric material is deposited between the recording layer L0 and the middle layer ML, and a reflection film MB1 which is made of aluminum or the like is deposited between the recording layer L1 and the substrate M1.

The middle layer ML is made of an ultraviolet curing type resin material which indicates a high permeability to the light beam irradiated and has a refractive index near a refractive index of the substrate.

Each of the recording layer L0 and the recording layer L1 is a rewritable recording layer which is formed so that recorded information can be rewritten. Namely, the optical disk 15 is configured as a single-side two-recording-layer optical disk so that the light beam irradiated is incident to the optical disk from one direction only, and two rewritable recording layers are provided on a single side of the optical disk. The track which has a guide groove in the spiral or concentric circle configuration is formed in each of the recording layers L0 and L1, respectively.

The optical disk 15 is placed in the optical disk device 20 so that the recording layer L0 is located closer to the optical pickup unit 23 than the recording layer L1.

A part of the light beam which is incident to the optical disk 15 is reflected by the translucent film MB0, and the remaining light beam penetrates the translucent film MB0. The light beam which passes through the translucent film MB0 is reflected by the reflection film MB1.

The optical pickup unit 23 is arranged for focusing the laser light beam onto a recording layer of the accessing object (which is called "target recording layer") of the two recording layers of the optical disk 15, and for receiving the reflected light beam from the optical disk 15.

Figure 3:
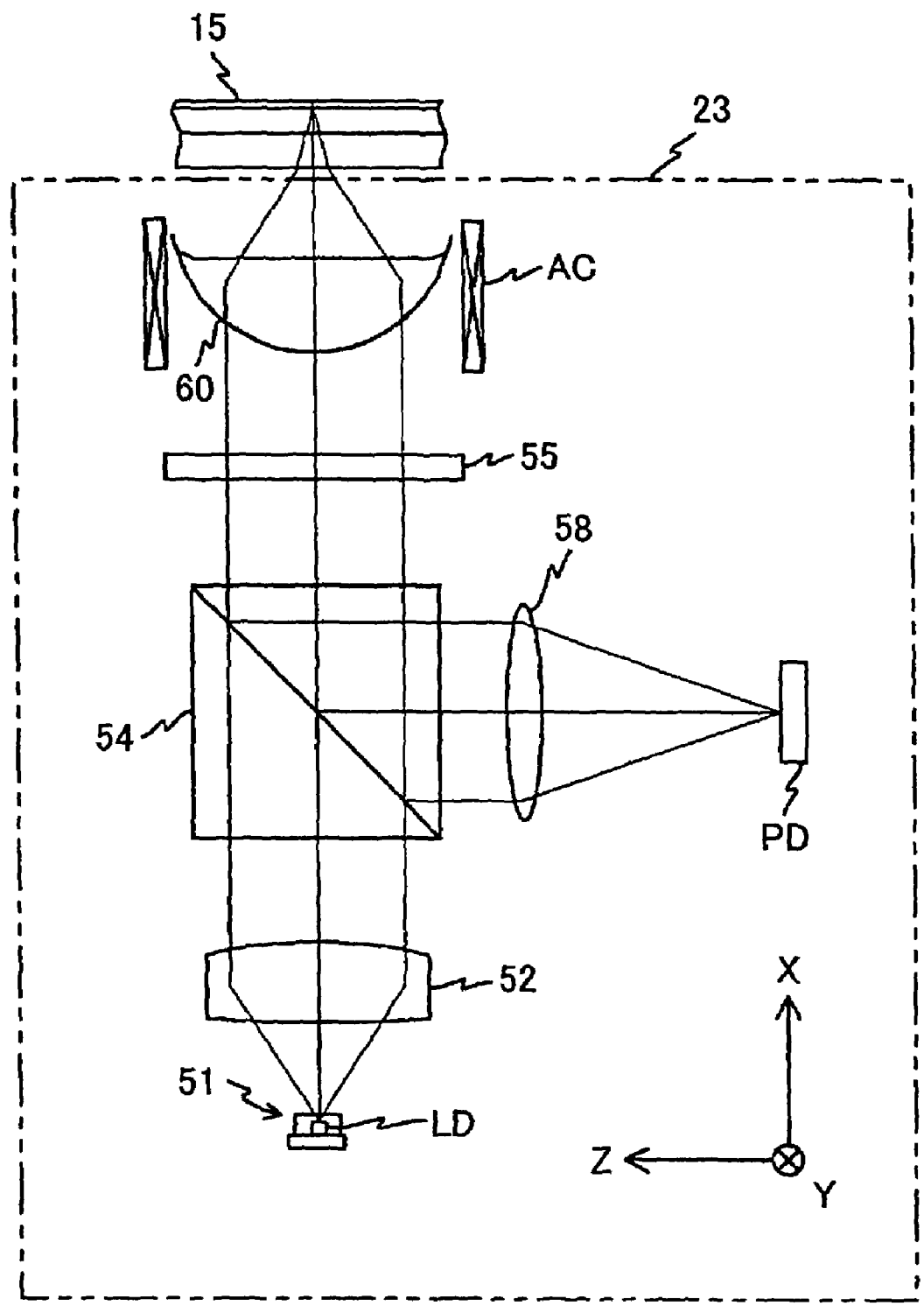
FIG. 3 is a diagram showing the composition of an optical pickup device in the optical disk device of FIG. 1.

FIG. 3 shows the composition of the optical pickup unit 23 in the optical disk device of FIG. 1.

As shown in FIG. 3, the optical pickup unit 23 comprises a light source unit 51, a coupling lens 52, a polarization beam splitter 54, a quarter-wave plate 55, an objective lens 60, a detection lens 58, a photodetector PD as a light intensity detector, and an actuator system AC for driving the objective lens 60.

The light source unit 51 is provided to include a semiconductor laser LD as the light source which emits a laser light beam that has a wavelength in conformity with the optical disk 15. In this embodiment, the maximum intensity output direction of the laser beam which is emitted from the light source unit 51 is set to the direction of +X indicated by the arrow in FIG. 3. It is supposed that the light source unit 51 emits a polarized laser light beam which direction of polarization of the laser light (P polarization) is parallel to the plane of incidence to the polarization beam splitter 54.

The coupling lens 52 is arranged on the +X side of the light source unit 51 so that the light beam emitted from the light source unit 51 is converted into a parallel light beam by the coupling lens 52.

The polarization beam splitter 54 is arranged on the +X side of the coupling lens 52. The polarization beam splitter 54 has a reflection factor that varies depending on the polarization state of the light beam incident to the polarization beam splitter 54. In this embodiment, the polarization beam splitter 54 is provided so that it has a small reflection factor when the incidence light beam is in p-polarized state, and has a large reflection factor when the incidence light beam is in s-polarized state. Namely, the major part of the light beam which is emitted from the light source unit 51 can penetrate the polarization beam splitter 54.

The quarter-wave plate 55 is arranged on the +X side of the polarization beam splitter 54. The quarter-wave plate 55 gives an optical phase difference of ¼ wavelength to the light beam incident to the quarter-wave plate 54. The objective lens 60 is arranged on the +X side of the quarter-wave plate 55, and the light beam passing through the quarter-wave plate 55 is focused onto the target recording layer of the optical disk by the objective lens 60.

The detection lens 58 is arranged on the −Z side of the polarization beam splitter 54, and focuses the returned light beam, which is branched in the −Z direction at the polarization beam splitter 54, onto the light-receiving surface of the photodetector PD.

The photodetector PD includes a plurality of light receiving elements (or light receiving areas) which are suitably arranged for the signal processing circuit 28 to output appropriate signals (photoelectric conversion signals) for detecting an RF signal, a wobble signal, a servo signal, etc.

The actuator system AC includes a tracking actuator for actuating the objective lens 60 by its small displacement in the focusing direction which is an optical axis direction of the objective lens 60, and a focusing actuator for actuating the objective lens 60 by its small displacement in the tracking direction of the objective lens 60.

For the sake of convenience of description in the following, the optimal position of the objective lens 60 with respect to the focusing direction when the target recording layer is the recording layer L0 will be called the "first lens position", and the optimal position of the objective lens 60 with respect to the focusing direction when the target recording layer is the recording layer L1 will be called the "second lens position".

Next, the operation of the above-described optical pickup unit 23 will be explained.

The linearly polarized light beam (which is in p-polarized state) emitted from the light source unit 51 is turned into a generally parallel light beam by the coupling lens 52, and this parallel light beam enters into the polarization beam splitter 54. The major part of this incident light beam penetrates the polarization beam splitter 54, and it is converted into a circularly polarized light beam by the quarter-wave plate 55, and this circularly polarized light beam is focused on the target recording layer of the optical disk 15 as a minute light spot through the objective lens 60.

The reflected light beam from the optical disk 15 becomes a circularly polarized light beam with the opposite polarization direction, and this circularly polarized light beam is again turned into a generally parallel light beam by the objective lens 60 as a returned light beam. And this returned light beam is converted into the linearly polarized light (which is in s-polarized state) that is perpendicular to the forward optical path by the quarter-wave plate 55.

The returned light beam passing through the quarter-wave plate 55 enters into the polarization beam splitter 54. The returned light beam which is reflected to the −Z direction by the polarization beam splitter 54 is received by the photodetector PD through the detection lens 58.

In the photodetector PD, photoelectric conversion of the incident light beam is carried out by each of the plurality of light receiving elements (or light receiving areas), and each of the plurality of photo-electrically converted signals is outputted from the photodetector PD to the signal processing circuit 28, respectively.

Referring back to FIG. 1, the signal processing circuit 28 is configured to acquire servo signals (a focus error signal, a track error signal, etc.), address information, synchronization information, an RF signal, etc. based on the plurality of output signals (the photo-electrically converted signals) of the photodetector PD.

The servo signals acquired by the signal processing circuit 28 are outputted to the drive control circuit 26, the address information acquired by the signal processing circuit 28 is outputted to the CPU 40, and the synchronization information acquired by the signal processing circuit 28 is outputted to the encoder 25 and the drive control circuit 26.

Moreover, the signal processing circuit 28 performs decoding processing and error detection processing of the acquired RF signal. When an error in the RF signal is detected, the signal processing circuit 28 performs error correction processing of the RF signal. The resulting signal after the error correction processing is completed is stored in the buffer RAM 34 through the buffer manager 37 as the reproduced data. The address information contained in the reproduced data is outputted to the CPU 40.

The drive control circuit 26 generates a drive signal to the tracking actuator for correcting a positional error of the objective lens 60 in the tracking direction, based on the track error signal received from the signal processing circuit 28.

The drive control circuit 26 generates a drive signal to the focusing actuator AC for correcting a focusing error of the objective lens 60, based on the focus error signal received from the signal processing circuit 28. Each of the actuator drive signals generated by the drive control circuit 26 is outputted to the optical pickup unit 23. Thereby, the tracking control and the focusing control of the optical pickup unit 23 are performed by the drive control circuit 26.

Moreover, the drive control circuit 26 generates a drive signal for driving the seek motor 21 and a drive signal for driving the spindle motor 22, based on the command signals received from the CPU 40. Each of the drive signals is outputted from the drive control circuit 26 to the seek motor 21 and the spindle motor 22, respectively.

The data (the recording data) to be recorded to the optical disk 15, and the data (the reproduced data) being reproduced from the optical disk 15 are temporarily stored in the buffer RAM 34. The input/output operation of data to and from the buffer RAM 34 is managed by the buffer manager 37.

Based on the command signal of the CPU 40, the encoder 25 reads out the recording data from the buffer RAM 34 through the buffer manager 37, performs modulation of the data, and addition of the error correction code, and generates the write signal to the optical disk 15. The write signal generated by the encoder 25 is outputted to the laser control circuit 24.

The laser control circuit 24 controls the emission power of the semiconductor laser LD. For example, in the case of recording information to the optical disk, the laser control circuit 24 generates a drive signal to the semiconductor laser LD based on the write signal, the recording condition, and the light emission characteristic of the semiconductor laser LD.

The interface 38 is a bidirectional communication interface between the optical disk device 20 and the host device 90 (for example, a personal computer). The interface 38 is adapted to be in conformity with the standard interfaces, such as ATAPI (AT Attachment Packet Interface), SCSI (Small Computer System Interface), and USB (Universal Serial Bus).

In the flash memory 39, various programs including the program according to the invention which is described in instruction codes decodable by the CPU 40, the recording condition including the recording power and the recording strategy information, the light emission characteristic of the semiconductor laser LD, etc. are stored.

The CPU 40 controls the operation of each of the device components in accordance with the above-mentioned program stored in the flash memory 39, and stores the data required for the control in the RAM 41 and the buffer RAM 34.

Figure 4:
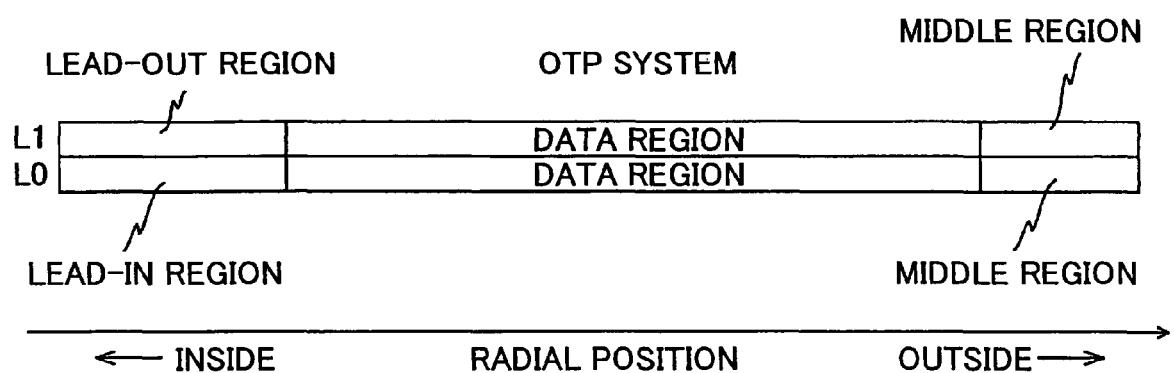
FIG. 4 is a diagram for explaining an OTP system.

FIG. 4 is a diagram for explaining the OTP system. It is supposed that information is recorded in the optical disk 15 in accordance with the OTP (opposite track path) system as shown in FIG. 4. The recording layer L0 is arranged to include the lead-in region, the data region, and the middle region, which are arrayed in this order from the inside radial position of the disk to the outside radial position of the disk. The recording layer L1 is arranged to include the middle region, the data region, and the lead-out region, which are arrayed in this order from the outside radial position of the disk to the inside radial position of the disk.

The physical address which increases continuously from the lead-in region to the middle region is assigned for the recording layer L0, and the physical address which is created by inversion of bits of the physical address of the corresponding area of the recording layer L0 and continuously increases from the middle region to the lead-out region is assigned for the recording layer L1.

The direction of the track path in the case of the OTP system is as follows. The direction of the track path for the recording layer L0 is the direction from the lead-in region to the middle region. The direction of the track path for the recording layer L1 is the direction from the middle region to the lead-out region.

Figure 5:
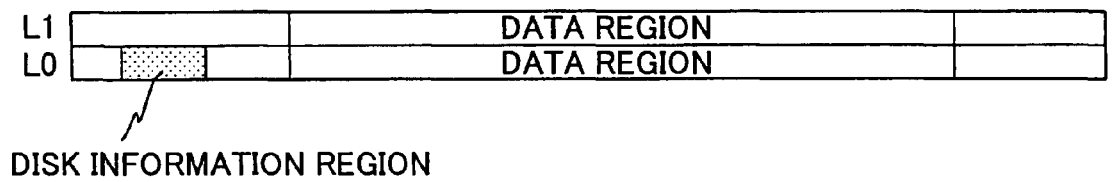
FIG. 5 is a diagram for explaining a disk information area.
Figure 6:
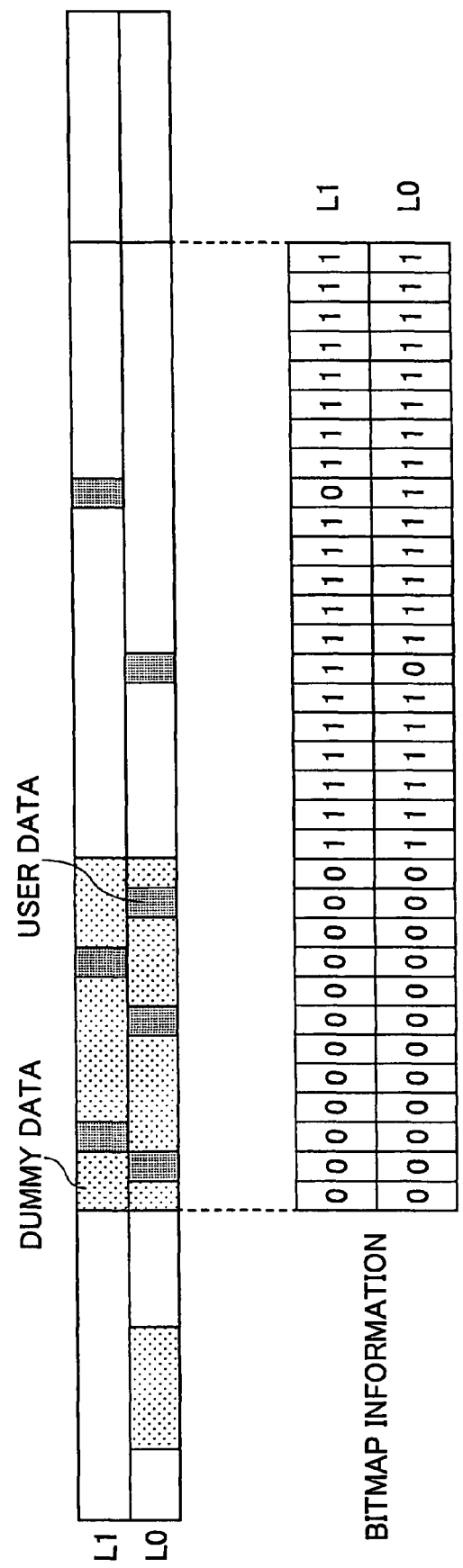
FIG. 6 is a diagram for explaining bitmap information.

FIG. 5 is a diagram for explaining the disk information area. FIG. 6 is a diagram for explaining the bitmap information. As shown in FIG. 5, the disk information area for storing disk information is provided in the lead-in region of the recording layer L0 of the optical disk 15. As shown in FIG. 6, the bitmap information which contains a given number of bits each indicating either the non-recorded state or the recorded state for every partial region in the data region is recorded in the disk information area. Namely, the partial region of the data region corresponding to "1" in the bitmap information is in the non-recorded state, and the partial region of the data region corresponding to "0" in the bitmap information is in the recorded state. Regardless of whether the currently recorded data is the user data or the dummy data, a corresponding bit of the bitmap information is set to "0". The size of the partial region in the optical disk is predetermined.

Figure 7:
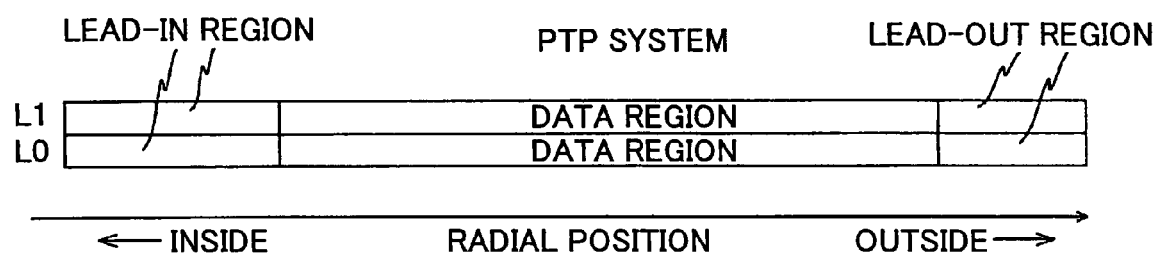
FIG. 7 is a diagram for explaining a PTP system.

FIG. 7 is a diagram for explaining the PTP system. Apart from the above-described optical disk 15 shown in FIG. 4, a single-side two-recording-layer write-once optical disk of another type in which information is recorded in accordance with the PTP (Parallel Track Path) system is also known. As shown in FIG. 7, in the optical disk according to the PTP system, the information area is formed for each of the two recording layers L0 and L1, and the information area of each recording layer is divided into the lead-in region, the data region, and the lead-out region, which are arrayed in this order from the inside radial position of the disk to the outside radial position of the disk, respectively.

In the case of the single-side two-recording-layer optical disk according to the PTP system, the information area is provided individually for each of the two recording layers, and the respective recording layers can be considered as being an independent recording layer. For each recording layer, the physical address which increases continuously from the lead-in region to the lead-out region is assigned, respectively.

The direction of the track path in the case of the PTP system is as follows. The direction of the track path for each recording layer is the direction from the lead-in region to the lead-out region.

Next, the recording processing which is performed by the optical disk device 20 when a recording request command from the host device 90 is received will be explained with reference to FIG. 8A through FIG. 10C.

Figure 8A:
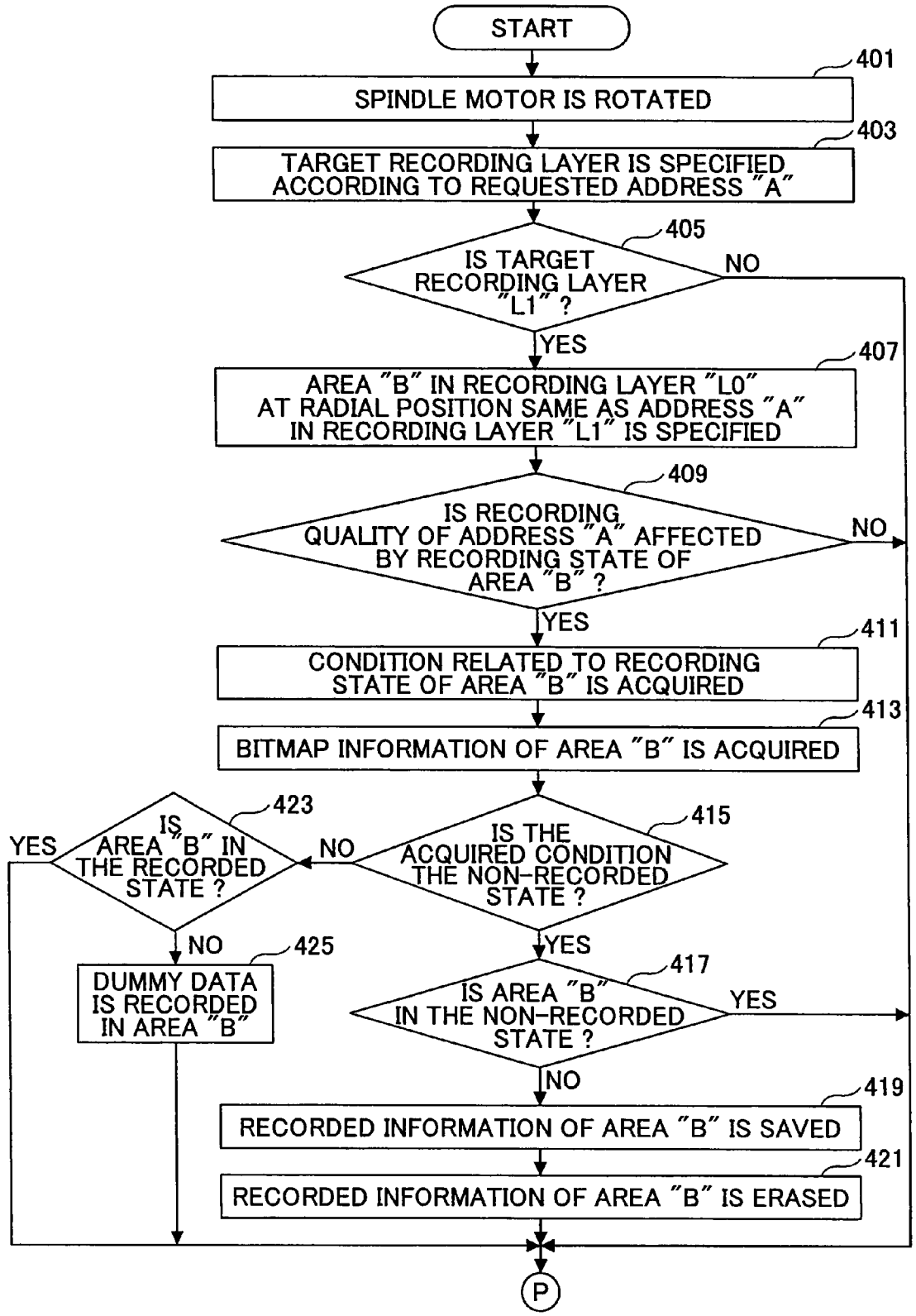
FIG. 8A and FIG. 8B are a flowchart for explaining recording processing which is performed by the optical disk device in an embodiment of the invention when receiving a recording request command from a host device.
Figure 8B:
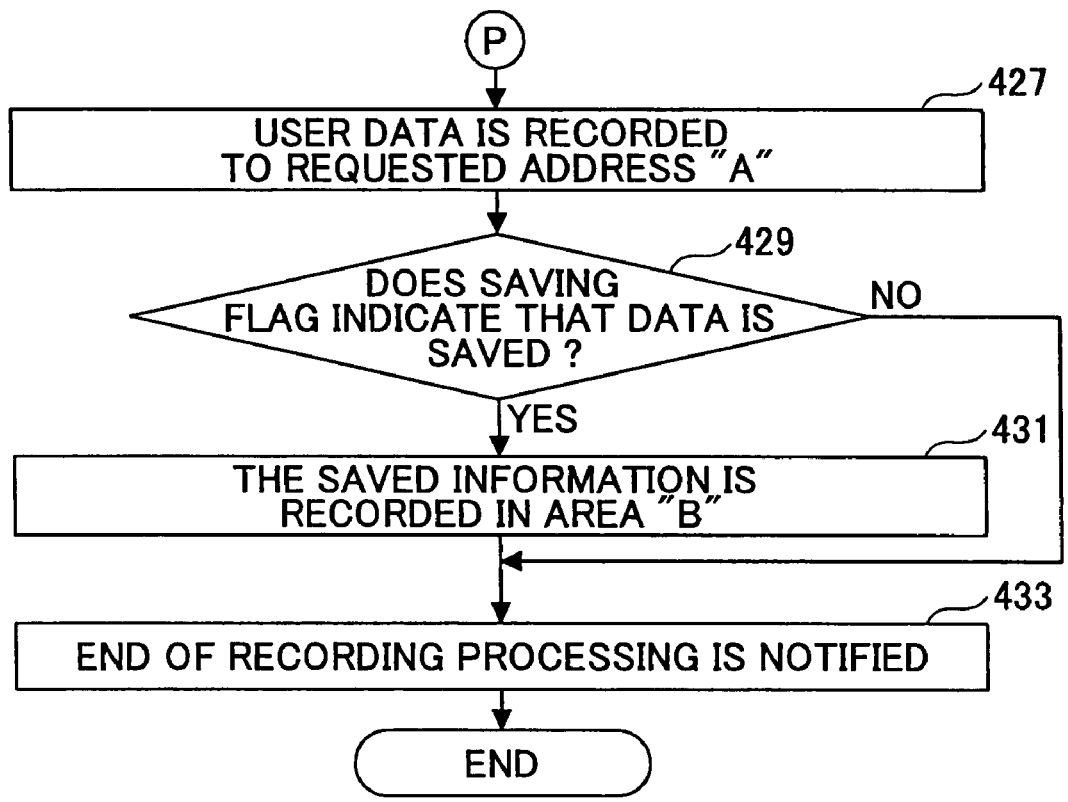

The flowchart of FIG. 8A and FIG. 8B corresponds to a series of steps in the processing algorithm performed by the CPU 40. FIG. 8A shows a part of the flowchart including steps 401 to 425, and FIG. 8B shows the remaining part of the flowchart including steps 427 to 433.

When a recording request command is received from the host device 90, the start address of the program corresponding to the flowchart of FIG. 8A and FIG. 8B stored beforehand in the flash memory 38 is set to the program counter of the CPU 40, and execution of the recording processing is initiated.

In the flowchart of FIG. 8A, at step 401, the CPU 40 controls the drive control circuit 26 so that the optical disk 15 is rotated at a predetermined linear velocity (or angular velocity), and notifies the signal processing circuit 28 that the recording request command is received from the host device 90. In addition, the CPU 40 resets the saving flag to "0". The saving flag is provided to indicate the existence of data being saved. The saving flag which is set to "0" at this step means that there is no data saved. On the other hand, the saving flag which is set to "1" means that there is data saved.

Next, at step 403, the CPU 40 extracts a requested address (referred to as A) from the recording request command, and specifies, according to the requested address A, one of the recording layer L0 and the recording layer L1 as being a target recording layer where user data is to be recorded.

Next, at step 405, the CPU 40 determines whether the specified target recording layer is the recording layer L1. When the specified target recording layer is the recording layer L1, the result of the determination at this step is affirmative and the control shifts to step 407.

At step 407, the CPU 40 specifies a partial region (which is referred to as "area B") of the recording layer L0 which is located at the radial position that is the same as that of the recording layer L1 corresponding to the requested address A. In this case, the physical address of the area B is created by inversion of bits of the physical address of the requested address A.

Next, at step 409, the CPU 40 retrieves the disk information (disk ID, disk kind, etc.) in the disk information area of the optical disk 15, and determines whether the optical disk 15 is an optical disk of the type in which the recording quality at the requested address A is influenced by the recording state (the non-recorded state or the recorded state) of the area B.

When the optical disk 15 is an optical disk of the type in which the recording quality at the requested address A is affected by the recording state of the area B, the result of the determination at this step is affirmative, and the control shifts to step 411.

At step 411, the CPU 40 retrieves the recording condition stored in the flash memory 39, and acquires the condition related to the recording state of the area B in the optical disk 15. In this respect, the recording condition related to the recording state (the non-recorded state or the recorded state) of one of the two recording layers located near the objective lens 60 when recording information on the other of the two recording layers located distant from the objective lens 60 is stored beforehand in the flash memory 39 as one of the recording conditions for every disk kind.

Next, at step 413, the CPU 40 retrieves the disk information in the disk information area of the lead-in region of the optical disk 15 and acquires the bitmap information of the area B.

Next, at step 415, the CPU 40 determines whether the condition related to the recording state of the area B in the optical disk 15, acquired at the step 411, is the non-recorded state. When the acquired condition related to the recording state of the area B in the optical disk 15 is the non-recorded state, the result of the determination at this step is affirmative, and the control shifts to step 417.

Figure 9A:
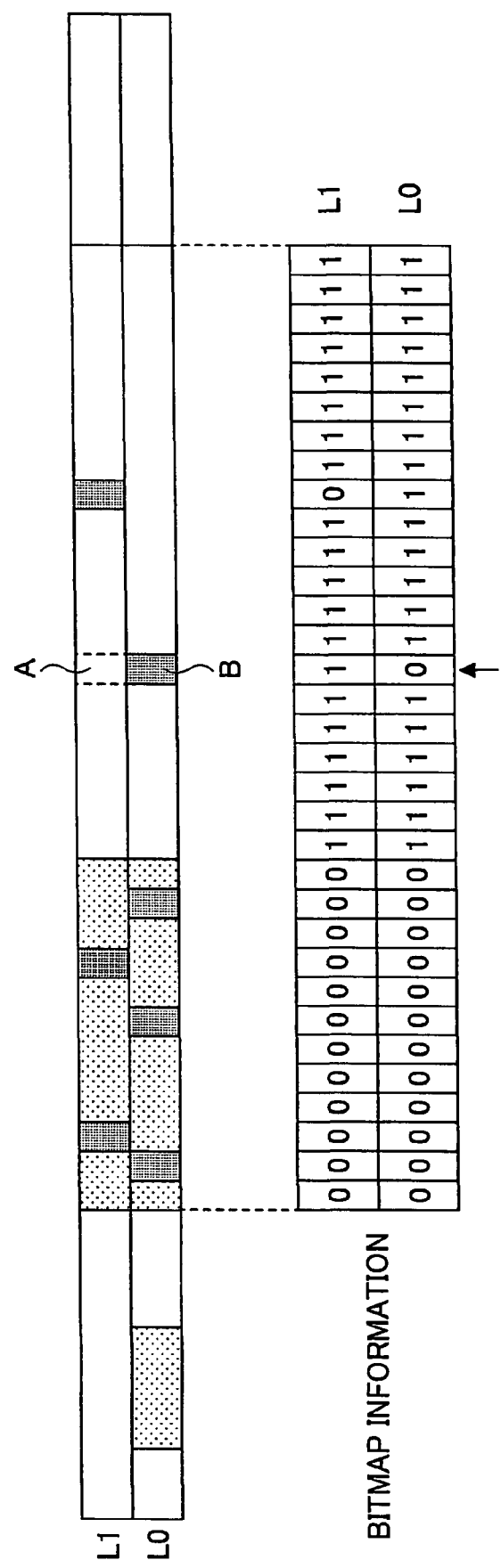

At step 417, the CPU 40 determines whether the recording state of the area B is the non-recorded state, based on the bitmap information of the area B acquired at the step 413. When the recording state of the area B is the recorded state as shown in FIG. 9A, the result of the determination is negative, and the control shifts to step 419.

At step 419, the CPU 40 controls the drive control circuit 26 so that the optical pickup unit 23 is driven to the target position corresponding to the area B, sets the target recording layer to the recording layer L0, and reads the data currently recorded in the area B and stores the read data in the RAM 41 as the saved data. Namely, the content of the recorded information of the area B is saved at this step. And the CPU 40 sets the saving flag to "1", which means that there is data saved.

Figure 9B:
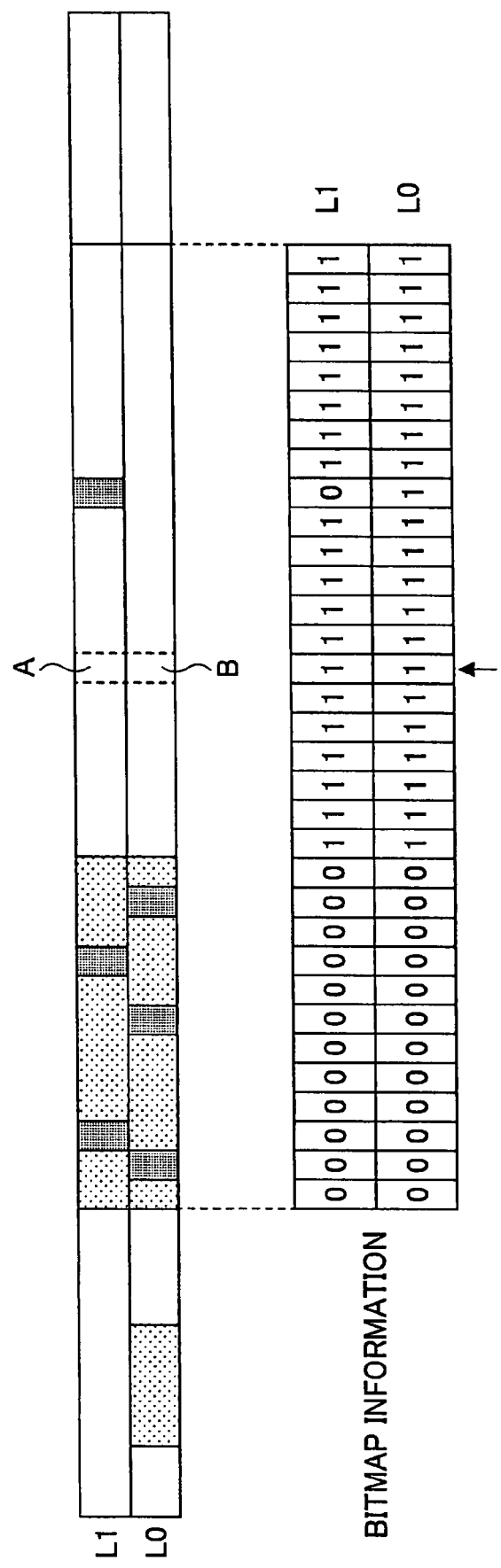

Next, at step 421, the CPU 40 controls the laser control circuit 24 so that the data currently recorded in the area B is erased, and the area B is set in the non-recorded state as shown in FIG. 9B. Specifically, the area B of the recording layer L0 in the optical disk 15 is irradiated by the laser beam of a predetermined erase power from the optical pickup unit 23. And the CPU 40 performs a layer jump and sets the target recording layer to the recording layer L1.

Referring to FIG. 8B, at step 427, the CPU 40 controls the encoder 25 and the laser control circuit 24 so that the optical pickup unit 23 records the requested data (user data) in the area in the recording layer L1 indicated by the requested address A, as shown in FIG. 9C.

Next, at step 429, the CPU 40 retrieves the saving flag and determines whether there is any data saved. In this case, the saving flag is set to "1" which means that there is data saved, and the result of the determination at this step is affirmative, and the control shifts to step 431.

Figure 9D:
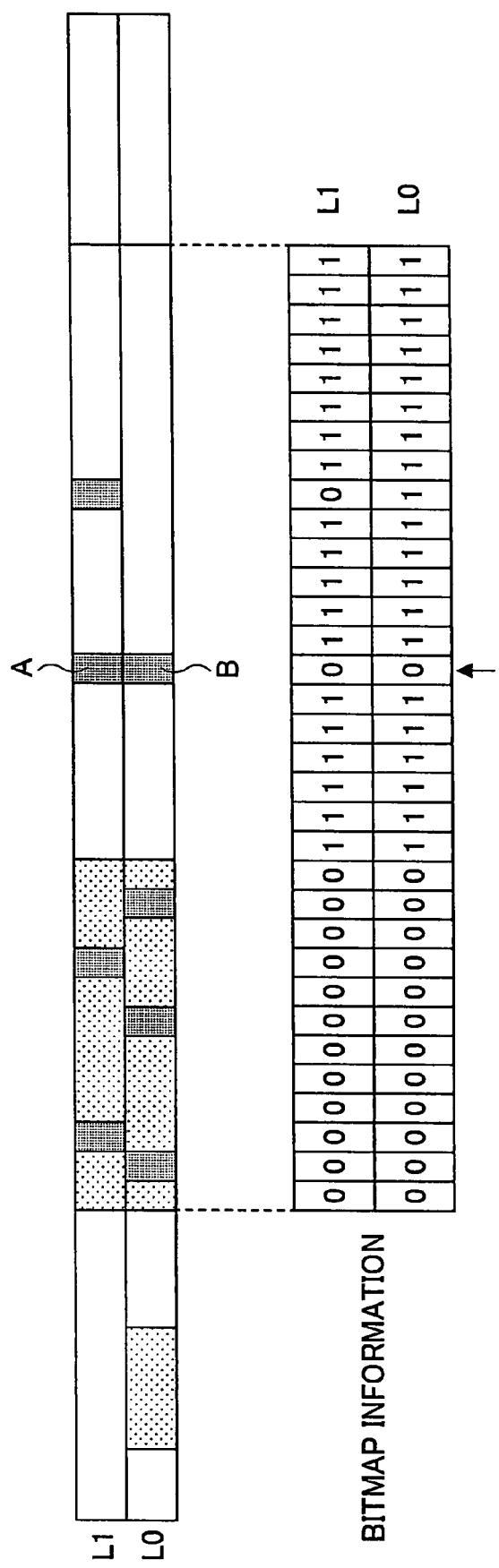

At step 431, the CPU 40 reads out the saved data stored in the RAM 41, performs a layer jump, and sets the target recording layer to the recording layer L0. And the CPU 40 records the saved data in the area B, as shown in FIG. 9D, and sets the saving flag to "0".

Next, at step 433, the CPU 40 notifies to the host device 90 the end of the recording processing. And the recording processing is terminated.

When the saving flag retrieved at the step 429 indicates there is no data saved, the result of the determination at the step 429 is negative, and the control shifts to the above step 433.

Referring back to FIG. 8A, when the recording state of the area B based on the acquired bitmap information of the area B is determined at the step 417 as being the non-recorded state (or when the result of the determination at the step 417 is affirmative), the control shifts to the above step 427.

On the other hand, when the condition related to the recording state of the area B in the optical disk 15 is determined at the step 415 as being the recorded state (or when the result of the determination at the step 415 is negative), the control shifts to step 423.

At step 423, the CPU 40 determines whether the recording state of the area B is the recorded state. When the recording state of the area B is the recorded state, the result of the determination at this step is affirmative, and the control shifts to the above step 427.

Figure 10A:
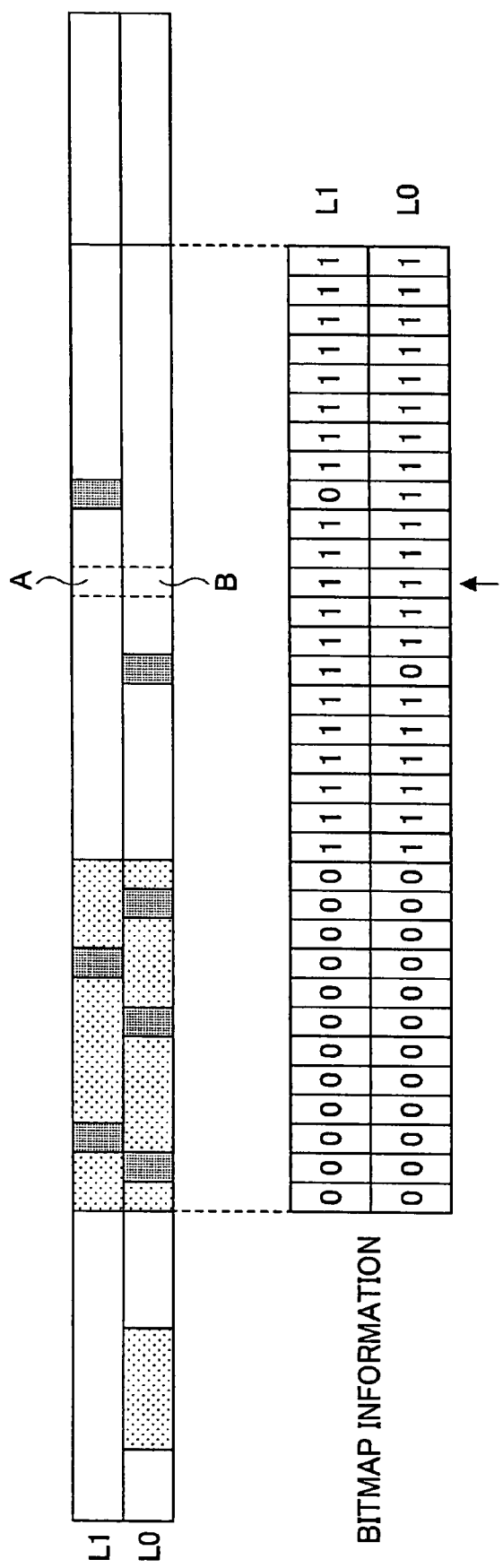
FIG. 10A, FIG. 10B and FIG. 10C are diagrams for explaining the recording processing of FIG. 8A and FIG. 8B.

On the other hand, when the recording state of the area B is the non-recorded state as shown in FIG. 10A, the result of the determination at this step is negative, and the control shifts to step 425.

Figure 10B:
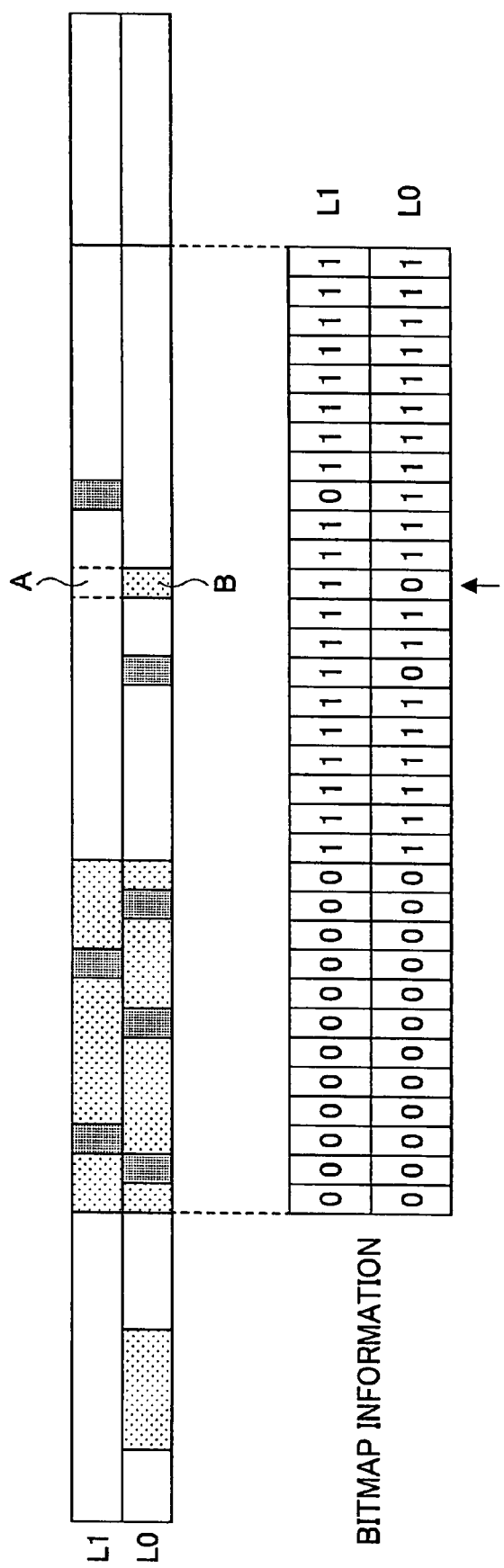
Figure 10C:
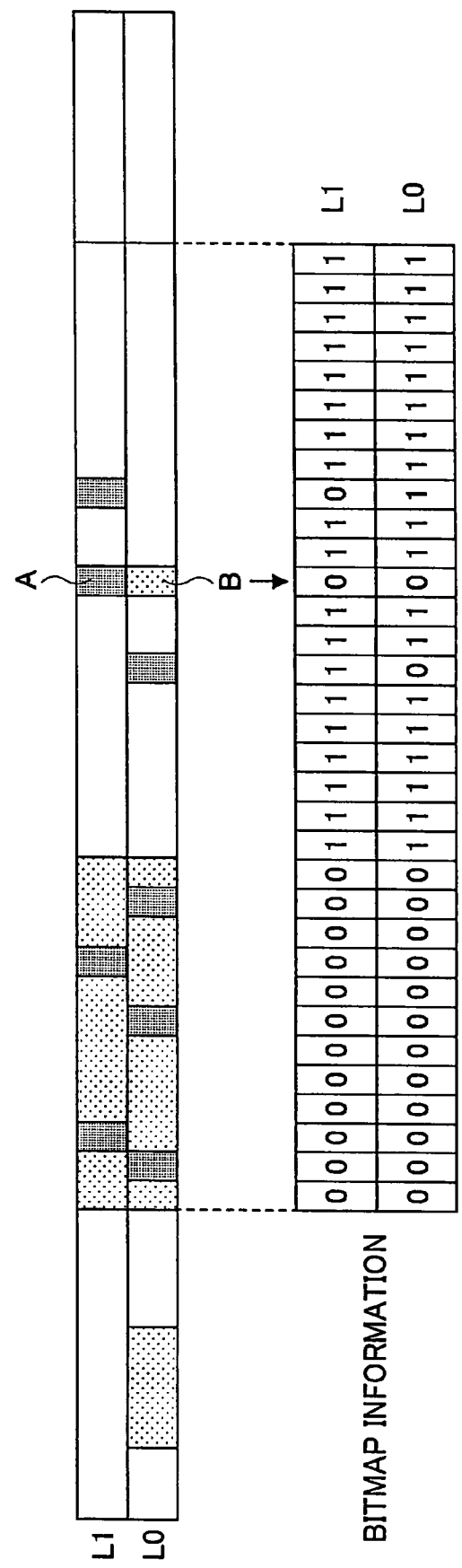

At step 425, the CPU 40 controls the drive control circuit 26 so that the optical pickup unit 23 is driven to the target position corresponding to the area B, sets the target recording layer to the recording layer L0, and controls the encoder 25 and the laser control circuit 24 so that the optical pickup unit 23 records dummy data in the area B of the recording layer L0, as shown in FIG. 10B. And the CPU 40 performs a layer jump, and sets the target recording layer to the recording layer L1. Then, the control shifts to the above step 427. In this case, the recording state of each recording layer of the optical disk after the user data is recorded at the step 427 is as shown in FIG. 10C.

When the optical disk 15 is determined at the step 409 as being not an optical disk of the type in which the recording quality at the requested address A is affected by the recording state of the area B (or when the result of the determination at the step 409 is negative), the control shifts to the above step 427.

When the specified target recording layer is determined at the step 405 as being not the recording layer L1 (or when the result of the determination at the step 405 is negative), the control shifts to the above step 427.

As is apparent from the above explanation, the recording processing performed by the optical disk device 20 of the present embodiment may be implemented by the program executed by the CPU 40 and the CPU 40. Alternatively, at least a part of the recording processing performed by the CPU 40 according to the program may be implemented by using the hardware arrangement. Alternatively, all of the recording processing may be implemented by using the hardware arrangement.

In the above-described embodiment, the program according to the invention is implemented by executing the program corresponding to the flowchart of FIG. 8A and FIG. 8B among the programs recorded in the flash memory 39 which is a computer-readable recording medium. The optical disk recording method according to the invention is implemented by performing the above-mentioned recording processing.

As explained above, according to the optical disk device 20 of the present embodiment, when the target recording layer in which user data is being recorded is the recording layer L1 which is located distant from the plane of incidence of the light beam among the two recording layer L0 and L1, it is determined in advance of recording of the user data in the recording layer L1 whether the recording quality at the requested address in the recording layer L0 is affected by the recording state of the corresponding area in the recording layer L1.

When the recording quality at the requested address in the recording layer L0 is affected, the recording state of the partial region of the recording layer L0 which is located at a radial position that is the same as that of the partial region of the recording layer L1 where the user data is being recorded is set to a selected recording state depending on the characteristic of the optical disk 15.

For example, when the optical disk 15 has the characteristic that, if a non-recorded area exists in the partial region of the recording layer L0, the recording quality in the recording layer L1 deteriorates, dummy data is recorded in the partial region of the recording layer L0 so that the non-recorded state of the partial region of the recording layer L0 is changed to the recorded state.

On the other hand, when the optical disk 15 has the characteristic that, if a recorded area exists in the partial region of the recording layer L0, the recording quality in the recording layer L1 deteriorates, the data currently recorded in the partial region of the recording layer L0 is saved in the RAM 41, and thereafter the data currently recorded in the partial region of the recording layer L0 is erased so that the recorded state of the partial region of the recording layer L0 is changed to the non-recorded state. And the user data is recorded to the requested address A in the recording layer L1, and then the saved data is recorded again to the erased partial region of the recording layer L0.

Therefore, it is possible to perform stably recording of information in the optical disk 15 with high quality according to the characteristic of the optical disk 15. Namely, it is possible to perform stably recording of information to an optical disk having a plurality of rewritable recording layers with high quality.

In the above-mentioned embodiment, when changing the recording state of the partial region of the recording layer L0, the bitmap information stored in the lead-in region is retrieved, and the recording processing can be performed quickly.

In the above-mentioned embodiment, the optical disk 15 on which information is recorded according to the OTP system has been used. However, the present invention is not limited to this embodiment. Alternatively, an optical disk in which information is recorded according to the PTP system may be used.

In the above-mentioned embodiment, when recording user data in the data region of the recording layer L1 of the optical disk 15, the recording state of the area B of the recording layer L0 is changed. However, the present invention is not limited to this embodiment. For example, when recording predetermined information in the lead-out region of the recording layer L1, or when recording predetermined information in the middle region of the recording layer L1, the recording state of the area B of the recording layer L0 may be changed. In this case, the bitmap information may be extended to new bitmap information in which the recording state of the lead-in region and the recording state of the middle region of the recording layer L0 are also defined in addition of the recording state of the lead-out region.

In the above-mentioned embodiment, the optical disk device in which recording and reproducing of information is possible has been described. However, the present invention is not limited to this embodiment, and it is applicable to any optical disk device in which recording of information is possible. Moreover, when the optical disk is a DVD, the optical disk device of the invention may be a DVD recorder in which the above-mentioned recording processing of the DVD is possible.

In the above-mentioned embodiment, the optical disk 15 which has the two recording layers L0 and L1 has been used. The present invention is not limited to this embodiment. Alternatively, an optical disk which has three or more recording layers may be used. In this case, it is preferred that, when two or more recording layers nearer to the plane of incidence of the laser beam than the target recording layer exist in the optical disk, the recording state of each of the two or more recording layers is set to a selected recording state depending on the characteristic of the optical disk sequentially from one of the two or more recording layers nearest to the plane of incidence.

In the above-mentioned embodiment, the program according to the invention is pre-recorded in the flash memory 39. Alternatively, it may be pre-recorded in another recording medium (CD, MO, DVD, memory card, USB memory, flexible disk, etc.). In such alternative embodiment, the program of the invention may be loaded to the flash memory 39 through a reproducing apparatus (or a specially adapted interface) conforming to each recording medium.

Alternatively, the program of the invention may be transmitted to the flash memory 39 from an external terminal through a network (LAN, the Intranet, the Internet, etc.). In short, what is needed is to load the program of the invention to the flash memory 39.

In the above-mentioned embodiment, the optical pickup unit is provided with one semiconductor laser. The present invention is not limited to this embodiment. Alternatively, it may be provided with a plurality of semiconductor lasers each of which emits a laser beam with a different wavelength. In such alternative embodiment, the plurality of semiconductor lasers may include any of a semiconductor laser which emits a laser beam whose wavelength is about 405 nm, a semiconductor laser which emits a laser beam whose wavelength is about 660 nm, and a semiconductor laser which emits a laser beam whose wavelength is about 780 nm.

Namely, the optical disk device in which the present invention is embodied may be an optical disk device which is adapted to use a plurality of kinds of optical disks which are in conformity with mutually different specifications.

In such alternative embodiment, at least one of the plurality of kinds of optical disks may be an optical disk having a plurality of rewritable recording layers.

As described in the foregoing, the optical disk recording method of the invention is appropriate for stably performing recording of information to an optical disk having a plurality of rewritable recording layers with high quality. The optical disk device of the invention is appropriate for stably performing recording of information to an optical disk having a plurality of rewritable recording layers with high quality.

The present invention is not limited to the above-described embodiments and variations and modifications may be made without departing from the scope of the invention.

Furthermore, the present application is based upon and claims the benefit of priority of Japanese patent application No. 2005-135504, filed on May 9, 2005, the entire contents of which are incorporated herein by reference.

The invention claimed is:

1. An optical disk recording method which is adapted to record information on an optical disk by a light beam incident to the disk in one direction, the disk having a plurality of rewritable recording layers including a first recording layer nearest to a plane of incidence of the light beam and a second recording layer distant from the plane of incidence, the method comprising the steps of:

specifying a target recording layer where user data is to be recorded from the first and second recording layers;

detecting whether the specified target recording layer is the second recording layer;

setting, prior to recording the user data to a requested address in the second recording layer when the specified target recording layer is the second recording layer, a partial region of the first recording layer corresponding to a radial position that is the same as that of the requested address in the second recording layer, to a selected recording state of either a non-recorded state or a recorded state depending on a characteristic of the disk; and recording the user data to the requested address in the second recording layer specified as the target recording layer, wherein the step of setting the partial region to the selected recording state is arranged so that, when it is detected that the disk is provided to have a characteristic that a recording quality in the second recording layer deteriorates if a recorded area exists in the partial region of the first recording layer, data currently recorded in the partial region of the first recording layer is saved in a memory unit and the recorded data in the partial region is erased so that the partial region is set in the non-recorded state, and wherein the method further comprises a step of recording the saved data from the memory unit to the partial region of the first recording layer after the user data is recorded to the requested address in the second recording layer in the step of recording.

2. The optical disk recording method according to claim 1 further comprising a step of detecting whether the disk is provided to have a characteristic that a recording quality in the second recording layer deteriorates if a non-recorded area exists in the partial region of the first recording layer.

3. The optical disk recording method according to claim 2 wherein, when it is detected that the disk is provided to have said characteristic, dummy data is recorded in the partial region of the first recording layer, in the step of setting the partial region to the selected recording state, so that the partial region is set in the recorded state.

4. The optical disk recording method according to claim 1 further comprising a step of detecting whether the disk is provided to have said characteristic.

5. The optical disk recording method according to claim 1 wherein the disk comprises bitmap information which contains a given number of bits each indicating either the non-recorded state or the recorded state for every partial region in a data region of the disk and is recorded in a disk information area of the disk, and wherein, in the step of setting the partial region to the selected recording state, it is detected whether a recording state of the partial region of the second recording layer is the non-recorded state, based on the bitmap information acquired from the disk.

6. The optical disk recording method according to claim 1 wherein, when two or more recording layers nearer to the plane of incidence of the light beam than the target recording layer exist in the disk, a recording state of each of the two or more recording layers is set to the selected recording state sequentially from one of the two or more recording layers nearest to the plane of incidence.

7. An optical disk device including a processor adapted to record information on an optical disk by a light beam incident to the disk in one direction, the disk having a plurality of rewritable recording layers including a first recording layer nearest to a plane of incidence of the light beam and a second recording layer distant from the plane of incidence, the processor comprising:

a first unit specifying a target recording layer where user data is to be recorded from the first and second recording layers;

a second unit detecting whether the specified target recording layer is the second recording layer;

a third unit setting, prior to recording the user data to a requested address in the second recording layer when the specified target recording layer is the second recording layer, a partial region of the first recording layer corresponding to a radial position that is the same as that of the requested address in the second recording layer, to a selected recording state of either a non-recorded state or a recorded state depending on a characteristic of the disk; and a fourth unit recording the user data to the requested address in the second recording layer specified as the target recording layer, wherein the processor is arranged so that, if a recorded area exists in the partial region of the first recording layer, the third unit erases data currently recorded in the partial region of the first recording layer so that the partial region is saved in a memory unit and the recorded data in the partial region is set in the non-recorded state, and wherein the method further comprises a step of recording the saved data from the memory unit to the partial region of the first recording layer after the user data is recorded to the requested address in the second recording layer in the step of recording.

8. The optical disk device according to claim 7 wherein the processor further comprises a detecting unit detecting whether the disk is provided to have a characteristic that a recording quality in the second recording layer deteriorates if a non-recorded area exists in the partial region of the first recording layer, and wherein the third unit is configured to record, when it is detected that the disk is provided to have said characteristic, dummy data in the partial region of the first recording layer, so that the partial region is set in the recorded state.

9. The optical disk device according to claim 7 wherein the processor further comprises a detecting unit detecting whether the disk is provided to have a characteristic that a recording quality in the second recording layer deteriorates if a recorded area exists in the partial region of the first recording layer.

10. The optical disk device according to claim 7 wherein the disk comprises bitmap information which contains a given number of bits each indicating either the non-recorded state or the recorded state for every partial region in a data region of the disk and is recorded in a disk information area of the disk, and wherein the third unit is configured to detect whether a recording state of the partial region of the second recording layer is the non-recorded state, based on the bitmap information acquired from the disk.

11. The optical disk device according to claim 7 wherein the third unit is configured to set, when two or more recording layers nearer to the plane of incidence of the light beam than the target recording layer exist in the disk, a recording state of each of the two or more recording layers to the selected recording state sequentially from one of the two or more recording layers nearest to the plane of incidence.

* * * * *